(12) United States Patent
Gaffoor (10) Patent No.: US 11,339,710 B2
(45) Date of Patent: May 24, 2022

(54) TURBOCHARGER

(71) Applicant: Feizal Alli Gaffoor, Johannesburg (ZA)

(72) Inventor: Feizal Alli Gaffoor, Johannesburg (ZA)

( * ) Notice: Subject to any disclaimer, the term of this patent is extended or adjusted under 35 U.S.C. 154(b) by 0 days.

(21) Appl. No.: 17/053,846

(22) PCT Filed: May 7, 2019

(86) PCT No.: PCT/ZA2019/050025
§ 371 (c)(1),
(2) Date: Nov. 9, 2020

(87) PCT Pub. No.: WO2019/217979
PCT Pub. Date: Nov. 14, 2019

(65) Prior Publication Data
US 2021/0239037 A1    Aug. 5, 2021

Related U.S. Application Data

(60) Provisional application No. 62/668,857, filed on May 9, 2018.

(51) Int. Cl.
*F02B 37/22* (2006.01)
*F01D 17/14* (2006.01)
*F02C 6/12* (2006.01)

(52) U.S. Cl.
CPC .............. *F02B 37/22* (2013.01); *F01D 17/14* (2013.01); *F02C 6/12* (2013.01); F05D 2220/40 (2013.01); F05D 2270/3011 (2013.01)

(58) Field of Classification Search
CPC ........ F01D 17/14; F01D 17/141; F01D 1/023; F02B 37/22; F02C 6/12; F05D 2220/40; F05D 2270/3011; Y02T 10/12
See application file for complete search history.

(56) References Cited

U.S. PATENT DOCUMENTS 4,003,675 A    1/1977  Stevens et al.
4,054,030 A *  10/1977 Pedersen ................. F02K 3/075
                                                          60/262

(Continued)

FOREIGN PATENT DOCUMENTS

DE    1303520    9/1994
EP    2067962    6/2009
GB    1554074    10/1979

OTHER PUBLICATIONS

Search report and written opinion dated Jul. 16, 2019 in International Application Serial No. PCT/ZA2019/050025.

*Primary Examiner* — Jesse S Bogue
(74) *Attorney, Agent, or Firm* — Haugen Law Firm PLLP (57) ABSTRACT

This invention relates to a turbocharger (210). More specifically, the invention relates to an axial-entry type turbocharger, where the exhaust gases are directed to meet the turbine wheel at least front-on, having a variable volume for controlling pressure, allowing for a substantially uniform pressure and uniform velocity to act simultaneously on and around the turbine wheel, while enabling the volume of the turbocharger to be adjusted under predetermined set pressure conditions. The turbocharge includes: a turbine housing defining a substantially axial primary flow duct, a primary turbine wheel (216) mounted along such primary flow duct (214), and a diverter (218) for diverting flow passing thereover into a primary annular flow path directed to impinge the primary turbine wheel (216). The turbine housing of the turbocharger defines a secondary flow duct (222) for directing some flow to: (i) impinge the primary turbine wheel (216); and/or (ii) bypass the primary turbine wheel (216). A secondary flow duct gate (223) controls flow through the secondary flow duct (222) and is movable between a closed position, wherein under low pressure conditions flow is restricted from flowing through the secondary flow duct (Continued)

(222), and an open position, wherein flow though the secondary flow duct (222) is enabled such that operative flow passes through both the primary and the secondary flow ducts (216, 222) under high pressure conditions. The turbocharger further includes at least one compressor coupled to the primary turbine wheel (216) via a primary transmission thereby to transmit drive from the primary turbine wheel (216) to the compressor.

17 Claims, 10 Drawing Sheets

(56) References Cited

U.S. PATENT DOCUMENTS

| | | | |
|---|---|---|---|
| 4,586,336 A * | 5/1986 | Horler | F01D 17/143 60/602 |
| 4,655,038 A * | 4/1987 | Linsi | F01D 25/246 60/602 |
| 4,776,168 A | 10/1988 | Woollenweber | |
| 4,979,874 A | 12/1990 | Myers | |
| 5,119,633 A * | 6/1992 | Brooks | F02C 6/12 60/624 |
| 5,142,868 A * | 9/1992 | Woon | F02C 9/18 60/624 |
| 5,372,485 A | 12/1994 | Sumser et al. | |
| 5,454,225 A | 10/1995 | Sumser et al. | |
| 6,216,459 B1 | 4/2001 | Daudel et al. | |
| 6,536,214 B2 * | 3/2003 | Finger | F01D 17/141 60/602 |
| 6,715,288 B1 | 4/2004 | Engels et al. | |
| 7,763,988 B1 * | 7/2010 | Dravis | F01D 1/023 290/1 R |
| 10,054,003 B2 * | 8/2018 | Eriksson | F02B 37/183 |
| 2003/0049120 A1 | 3/2003 | Behrendt et al. | |
| 2003/0123977 A1 | 7/2003 | Bertnik et al. | |
| 2003/0150211 A1 | 8/2003 | Fledersbacher et al. | |
| 2010/0278651 A1 | 11/2010 | Jarusel et al. | |
| 2013/0323041 A1 | 12/2013 | Kierat | |
| 2014/0150423 A1 * | 6/2014 | Heyes | F02B 37/002 60/599 |

* cited by examiner

TURBOCHARGER

FIELD OF THE INVENTION

THIS invention relates to a turbocharger. More specifically, the invention relates to an axial-entry type turbocharger, where the exhaust gases are directed to meet the turbine wheel at least front-on, having a variable volume for controlling pressure. This allows for a substantially uniform pressure and uniform velocity to act simultaneously on and around the turbine wheel, while enabling the volume of the turbocharger to be adjusted under predetermined set pressure conditions.

BACKGROUND OF THE INVENTION

The most commonly used turbochargers, particularly in the automotive industry, are radial-flow type turbochargers. These turbocharges utilise a volute for entry of exhaust gases from the engine into the turbine section of the turbo charger. The intake is usually tangential to the rotational axis of the turbine wheel. This results in an uneven and non-simultaneous force around the turbine wheel, which reduces the lifespan and efficiency of the turbocharger due to uneven wear of the bearings and or bearing housing over time.

Radial-flow type turbochargers also suffer from turbo-lag when the exhaust flow pressure is low. A given volume of gas is required to flow and traverse the volute of the turbocharger housing to ultimately dispel all its energy to the turbine, which under low pressure conditions, takes time giving rise to turbo-lag. To overcome turbo-lag in radial-flow type turbochargers, variable geometry turbochargers, dual-volute turbochargers and variable-volute turbochargers have been developed. Other turbochargers inject compressed gas to drive the turbine wheel during low exhaust gas pressure conditions.

While these do aid in reducing turbo-lag to some degree, they tend to suffer from sticking or clogging over time. Also, these and other types of turbochargers do not address the uneven and non-simultaneous forces acting on the turbine wheel adequately, if not at all. In current radial-flow, variable geometry turbochargers, a volute system of entry is still utilised and the pressure impacting each of the vanes is not uniform as the gas mass decreases while operatively progressing from the intake port further into the narrowing volute, before being totally expelled.

Axial-flow turbochargers are generally known, and to a large extent overcome the uneven wear problems associated with radial-flow type turbochargers by introducing exhaust flow to the turbone wheel front-on. However, the currently available axial-entry flow turbochargers are limited to single flow path and single turbine wheel configurations. None of the current axial-entry turbochargers cause the bending of the gas flow radially inwards to impact the blades substantially tangential to the rotational axis. This results in more torque than at any other angle, to overcome the mass of the wheel and the connected components.

Furthermore, none provide for variable volume control and/or the re-routing of a portion of the axial flow to impinge the turbine wheel, and/or further turbine wheels making up subsequent stages of the turbochargers, so as to impact such turbine wheels with two or more of an axial, circumferential and radial flow component.

It is therefore an object of the present invention to provide an axial-entry type turbocharger having variable volume control and/or the ability of re-routing a portion of the axial flow, as well as re-directing such flow relative to a turbine wheel, thereby to produce more torque to overcome the mass of the turbine and compressor wheels so as to reduce uneven wear on bearings and reduce turbo lag.

SUMMARY OF THE INVENTION

According to the invention there is provided a turbocharger including:
a turbine housing defining a primary flow duct having at least one inlet, at least one outlet and a portion therebetween that is axial such that operative flow through the axial flow duct portion is substantially parallel with a central axis thereof;
a primary turbine wheel mounted along the axial flow duct portion of the turbine housing, wherein the primary turbine wheel is rotatable relative to the turbine housing about a primary rotary axis being aligned with or parallel to the central axis of the axial flow duct portion;
a diverter located along the axial flow duct portion and upstream of the a primary turbine wheel, the diverter being concentric with the primary rotary axis and operatively diverts flow passing thereover into a primary annular flow path defined between the diverter and periphery of the primary flow duct; and
at least one compressor coupled to the primary turbine wheel via a primary transmission thereby to transmit drive from the primary turbine wheel to the compressor;
characterised in that the turbine housing further:
defines a secondary flow duct having at least one inlet, and at least one secondary flow duct outlet being configured for operatively directing flow to: (i) impinge the primary turbine wheel; and/or (ii) bypass the primary turbine wheel; and
includes a secondary flow duct gate movable between a closed position, wherein the inlet to the secondary flow duct is closed such that operative flow passes only through the primary flow duct under low pressure conditions, and an open position, wherein the inlet to the secondary flow duct is open such that operative flow passes through both the primary and the secondary flow ducts under high pressure conditions, such that the increased flow volume provided operatively by the opened secondary flow path acts at least partially as a pressure relief mechanism.

The secondary flow duct is preferably annular, at least partially concentric with and located radially beyond the primary flow duct relative to the central axis thereof.

Generally, the inlet to secondary flow duct lies nearer a leading end of the diverter, with the secondary flow duct outlet thereof lying nearer a trailing end of the diverter, the diverter being radially divergent, at least across a portion of its axial length, from the leading end towards the trailing end thereof.

Typically, the diverter includes a plurality of radially projecting diverter fins, spaced circumferentially about the diverter, for dividing the primary annular flow path into a plurality of annular sector cross-sectioned primary flow channels and operatively steering the axial flow over the diverter.

Preferably, the secondary flow duct gate is annular, concentric with the primary flow duct and axially movable back-and-forth along the central axis relative to the turbine housing to open and close the annular inlet of the secondary flow duct.

The primary turbine wheel may include a plurality of: (i) primary impact vanes projecting radially from and spaced circumferentially about the primary turbine wheel; (ii) primary aerofoil-shaped lift vanes projecting radially from and spaced circumferentially about the primary turbine wheel; or (iii) a combination of both primary impact and aerofoil-shaped lift vanes.

Generally, the primary vanes are parallel with the primary rotary axis, or angled with respect thereto.

In one embodiment, the diverter fins of the diverter may be helical for operatively steering the axial flow passing over the diverter into a flow to optimally impinge the primary turbine wheel. It will be appreciated that the diverter fins are helical for the axial length of the diverter, or for at least a part of such axial length.

In an alternative embodiment, the turbocharger may include an annular primary deflector located between the trailing end of the diverter and the primary turbine wheel, the primary deflector having a plurality of angled primary deflector fins for operatively steering the axial flow entering the primary deflector from the primary annular flow path into a flow having two or more of an axial, circumferential and radial flow component onto the primary turbine wheel.

Preferably, the turbocharger includes a secondary turbine wheel mounted along the axial flow duct portion of the turbine housing, downstream of the primary turbine wheel, wherein:
  the secondary turbine wheel is rotatable relative to the turbine housing about a secondary rotary axis being aligned with or parallel to the primary rotary axis of the primary turbine wheel; and
  the secondary flow duct is configured such that the secondary flow duct outlet thereof is configured for operatively directing flow to bypass the primary turbine wheel and impinge the secondary turbine wheel;
  characterised in that the secondary turbine wheel is coupled to the same compressor, a secondary stage of the same compressor or secondary compressor via a secondary transmission thereby to transmit drive from the secondary turbine wheel to the compressor; the secondary stage thereof or the secondary compressor.

The primary flow duct of the turbine housing may be configured to operatively flow through the axial flow duct portion to impinge the primary turbine wheel and subsequently to impinge the secondary turbine wheel.

Alternatively, the primary flow duct of the turbine housing and the secondary turbine wheel may be configured to operatively channel flow exhausting from the primary turbine wheel to bypass the secondary turbine wheel such that the secondary turbine wheel is driven only by flow from the secondary flow duct.

Generally, the secondary turbine wheel includes a plurality of: (i) secondary impact vanes projecting radially from and spaced circumferentially about the secondary turbine wheel; (ii) secondary aerofoil-shaped lift vanes projecting radially from and spaced circumferentially about the secondary turbine wheel; or (iii) a combination of both secondary impact and aerofoil-shaped lift vanes.

Typically, the secondary vanes are parallel with the secondary rotary axis, or angled with respect thereto.

Preferably, the turbocharger including an annular secondary deflector located between the secondary flow duct outlet of the secondary flow duct and the secondary turbine wheel, the secondary deflector having a plurality of angled secondary deflector fins for operatively steering the flow exhausting from the secondary flow duct into a flow having two or more of an axial, circumferential and radial flow component onto the secondary turbine wheel.

Furthermore, the pitch of one or more of the primary vanes, the secondary vanes, the primary deflector fins and the secondary deflector fins may be variable.

Generally, the primary turbine wheel is:
shaft-mounted, comprising:
  a hub on which the primary wheel is rotatably supported on a primary drive shaft;
  a base rim, spaced radially outwardly from the hub and from which the primary vanes radially project; and
  a rim support for connecting the base rim to the hub, the rim support being a solid disc, a disc with a plurality of apertures defined therein or a plurality of spokes;
or
rim-mounted, comprising:
  a primary base ring having:
    an outer diameter from which the primary vanes radially project; and
    an inner diameter having gear formations running the circumference thereof; and
  a plurality of planetary gears positioned between the primary base ring gear formations and a sun gear mounted on a primary drive shaft such that drive is transmissible from the rim-mounted primary turbine wheel to the primary drive shaft.

Typically, the secondary turbine wheel is:
shaft-mounted, comprising:
  a hub on which the secondary wheel is rotatably supported on a secondary drive shaft;
  a base rim, spaced radially outwardly from the hub and from which the secondary vanes radially project; and
  a rim support for connecting the base rim to the hub, the rim support being a solid disc, a disc with a plurality of apertures defined therein or a plurality of spokes;
or
rim-mounted, comprising:
  a secondary base ring having:
    an outer diameter from which the secondary vanes radially project; and
    an inner diameter having gear formations running the circumference thereof; and
  a plurality of planetary gears positioned between the secondary base ring gear formations and a sun gear mounted on a secondary drive shaft such that drive is transmissible from the rim-mounted secondary turbine wheel to the secondary drive shaft.

Where the primary and the secondary turbine wheels are rim-mounted, the respective base ring, inner diameter gear formations, sun gear and planetary gears are the secondary transmissions, consequentially to drive the compressor, the first and second stages of the compressor or the two independent compressors.

Where the primary and the secondary turbine wheels are shaft-mounted, the primary and the secondary drive shafts may be a single common drive shaft connected to the compressor. Alternatively, the primary and the secondary drive shafts are each connected to separate compressors.

In a particularly preferred embodiment, the primary drive shaft is connected to a primary compressor impeller in a first stage of the compressor with the secondary drive shaft being connected to a secondary compressor impeller in a second stage of the compressor. Preferably, at least one of the primary and the secondary drive shaft is hollow such that the other of the drive shafts passes concentrically therethrough.

The compressor typically comprises a primary compressor wheel housed in a compressor housing, with the compressor housing being securable to the turbine housing or integral therewith. Preferably, the compressor further comprises a secondary compressor wheel, with the primary compressor wheel being driven by the primary turbine and primary transmission, and the secondary compressor wheel being driven by the secondary turbine wheel and secondary transmission.

Generally, the perforated or spoke configured rim support disc, or the hollow body of the base rings, doubles as an exhaust path through which exhaust flow from the primary turbine wheel is operatively exhaustible to bypass the secondary turbine wheel such that the secondary turbine wheel is driven only by flow from the secondary flow duct.

Typically, the secondary flow duct gate is axially movable towards the open and/or closed positions by an actuator, the actuator being mechanically or electronically controllable to move in the event of predetermined set conditions.

The secondary flow duct gate may be movable to one of the open or the closed positions by the actuator, and movable to the other of the open or the closed positions by a biasing means.

Typically, the primary and/or the secondary flow ducts define one or more diametric constrictions along their lengths for operatively increasing the flow velocity therethrough.

Preferably, the constrictions are located directly upstream of the primary or the secondary turbine wheels.

The primary flow duct may comprise guiding formations therealong for re-directing at least some of the axial flow into a radially inwardly directed flow onto the primary turbine wheel. Similarly, the secondary flow duct may comprise guiding formations therealong for re-directing the flow into a radially inwardly directed flow onto the secondary turbine wheel.

Generally, the guiding formations project radially inwardly near the primary and secondary flow duct outlets, thereby acting as a constriction to flow to increase flow velocity therethrough.

Typically, the secondary flow duct gate comprises a tapering diameter for constricting the flow and thereby increasing flow velocity therethrough.

BRIEF DESCRIPTION OF THE INVENTION

The invention will now be described in more detail, by way of example only, with reference to the accompanying illustrations, in which.

DETAILED DESCRIPTION OF THE INVENTION

Figure 1:
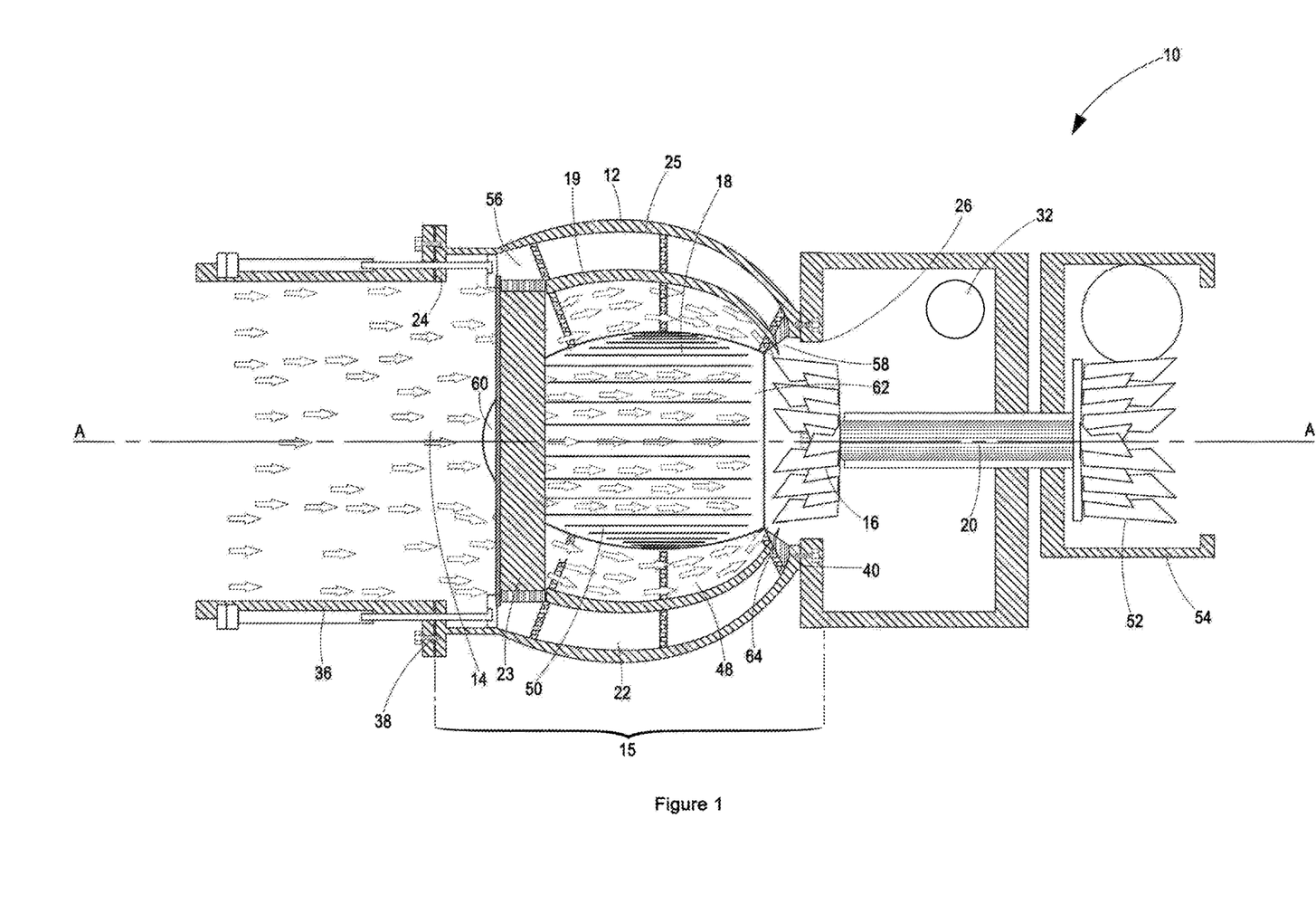
FIG. 1 is a cross-sectional side view of a first embodiment of a turbocharger in accordance with the present invention, with a secondary flow duct closed to flow.
Figure 2:
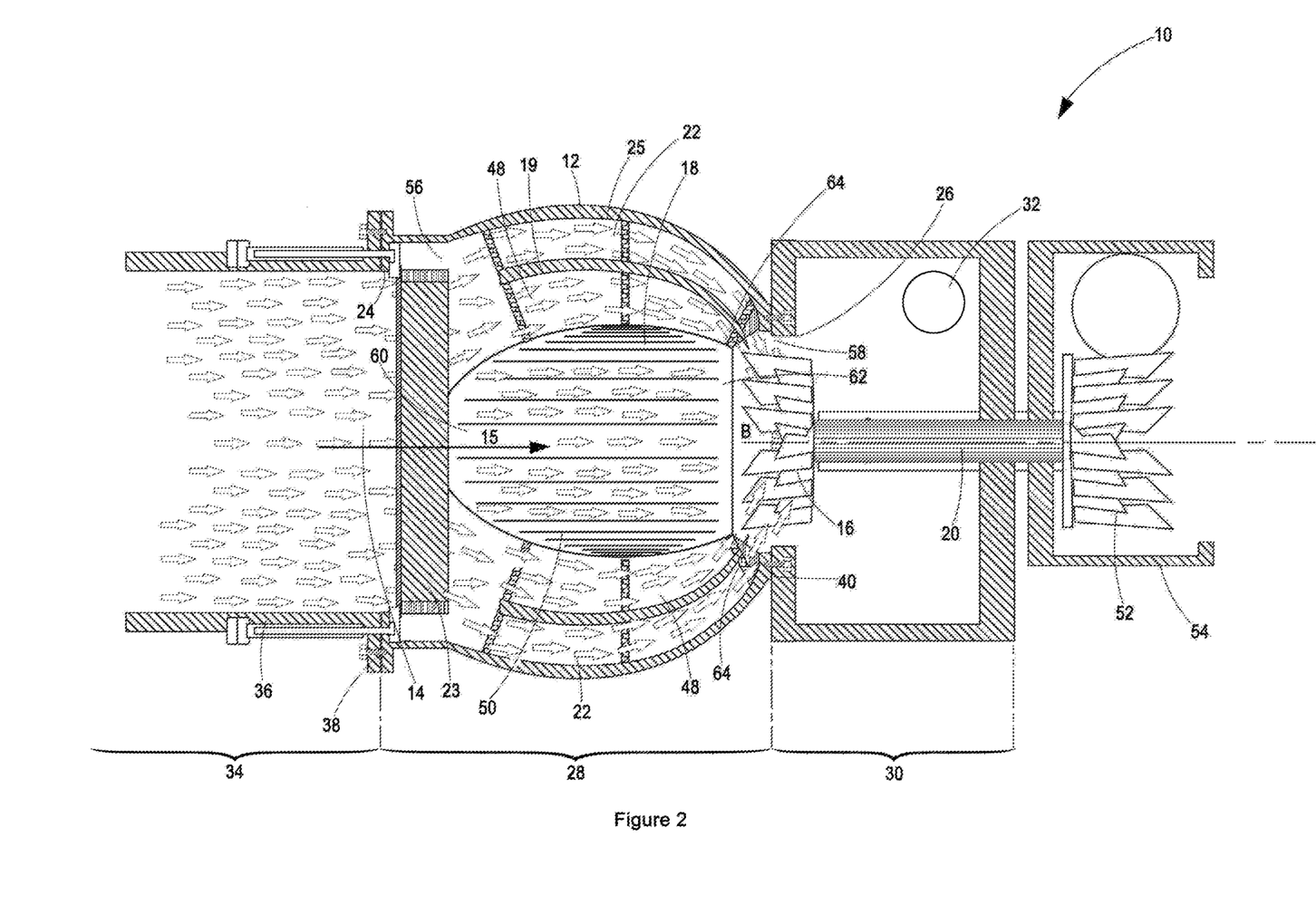
FIG. 2 is a cross-sectional side view of the turbocharger of FIG. 1, with a secondary flow duct open to flow.

A turbocharger according to a preferred embodiment of the invention is designated generally in the accompanying FIGS. 1 and 2 by reference numeral 10. The turbocharger 10 comprises a turbine housing 12 defining a primary flow duct 14, a primary turbine wheel 16, a diverter 18, a primary transmission 20, a secondary flow duct 22 and a secondary flow duct gate 23 for controlling flow through the secondary flow duct 22.

The primary flow duct 14 has an inlet 24, an outlet 26 and an axial flow duct portion 15 therebetween being substantially axial such that operative flow through the axial flow duct portion 15 is substantially parallel with a central axis A-A thereof.

The turbine housing 12 is typically made up of at least a diverter housing 28 and a turbine wheel housing 30. The diverter housing 28 substantially defines the axial flow duct portion 15 and the diverter 18. The turbine wheel housing 30 houses the primary turbine wheel 16 (which may extend upstream into the diverter housing 28), primary transmission (in the form of a primary drive shaft 20, which may extend into the diverter housing 28 and upstream into the compressor housing 54) and a turbocharger exhaust port 32.

Furthermore, the turbine housing 12 may also be made up of an actuator housing 34 housing one or more actuators 36 for moving the secondary flow duct gate 23 between open and closed positions. It will be appreciated that the diverter, the primary turbine wheel and the actuator housings 28, 30, 34 may be manufactured integrally, or fastenable together by one or more boltable flanges 38, 40. It will be appreciated further that the actuator housing 34 may instead be a portion of an exhaust pipe on which the actuator mechanism 34 is mounted.

The primary turbine wheel 16 is mounted along the axial flow duct portion 15 of the turbine housing 12 and rotatable relative thereto about a primary rotary axis B-B, which in this preferred embodiment is aligned with the central axis A-A. It will be appreciated that the primary rotary axis B-B, instead of being aligned with the central axis A-A, may be instead parallel therewith.

Figure 3:
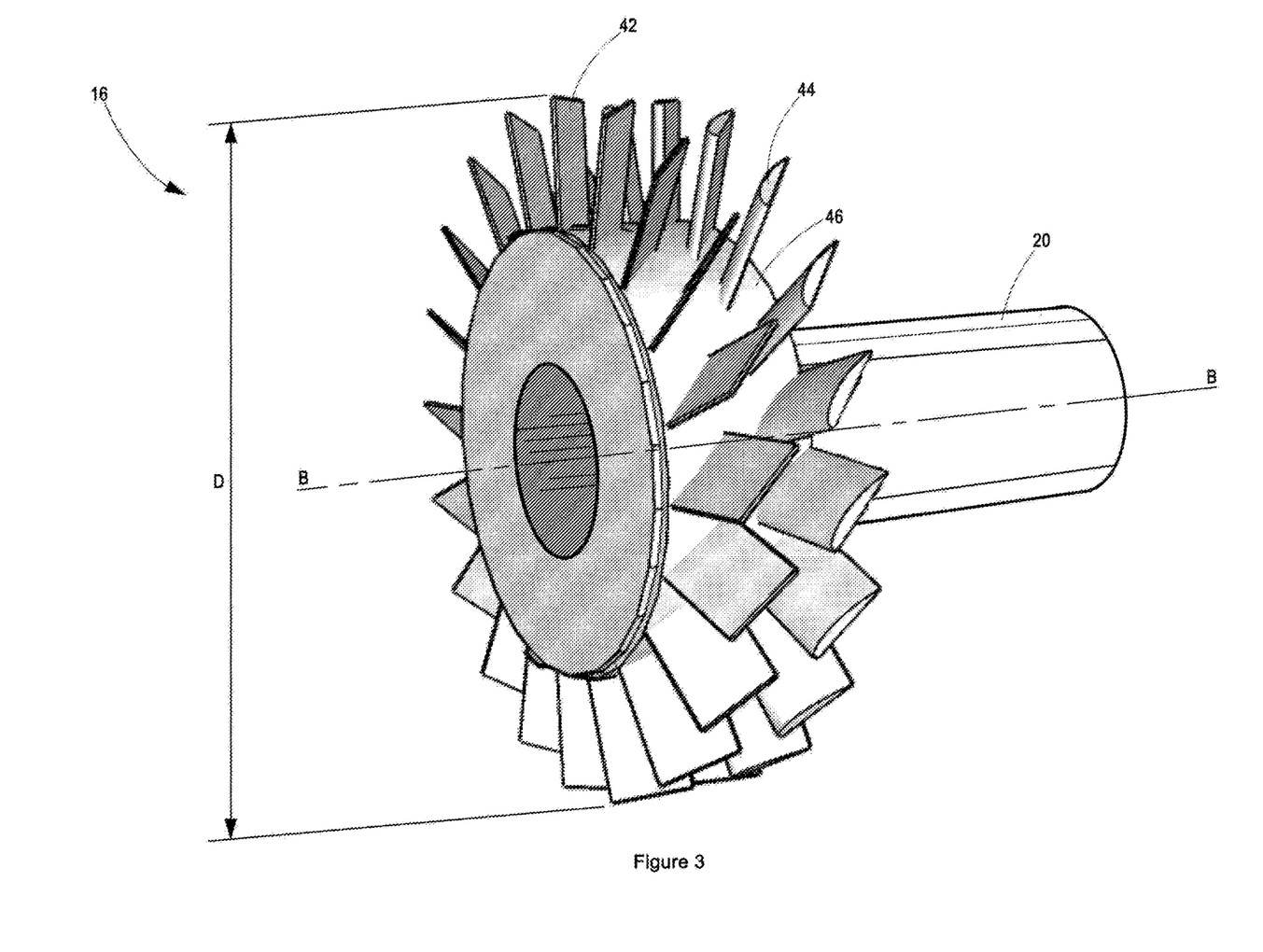
FIG. 3 is a perspective view of a primary turbine wheel of the turbocharger of FIG. 1.
Figure 4:
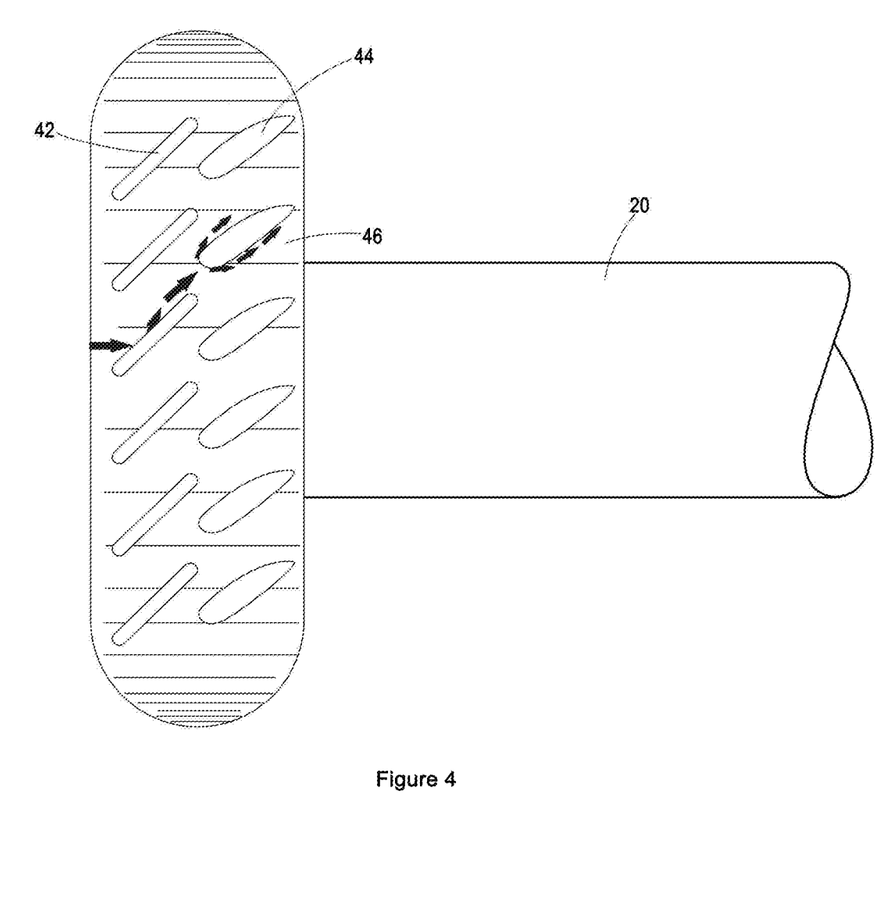
FIG. 4 is a side view of the primary turbine wheel of FIG. 3.

With reference now to FIG. 3 and FIG. 4, the primary turbine wheel 16 includes two arrays of vanes, the first being impact type vanes 42, with the second being lift type vanes 44. Each of the vanes 42, 44 project radially from and are spaced circumferentially about a base rim 46 of the primary turbine wheel 16.

The impact vanes 42 are angled relative to the central axis A-A such that the operative axial flow impacts such vanes 42, thereby to impart a torque to the primary turbine wheel 16. The aerofoil-shaped lift vanes 44 act as a second torque stage and are angled relative to the impact vanes 42 such that flow deflected from the impact vanes 42 flows toward and over the aerofoil-shaped lift vanes 44, such that lift generated by the aerofoil-shaped lift vanes 44 provides further torque to the primary turbine wheel 16 in the same direction.

Although the primary turbine wheel 16 has been depicted in the accompanying Figures as having two arrays of vanes, it will be appreciated that the primary turbine wheel 16 may only have a single array of either impact vanes 42, aerofoil-shaped lift vanes 44 or a combination of the two.

Referring back to FIGS. 1 and 2, the diverter 18 is located along the axial flow duct portion 15 and upstream of the primary turbine wheel 16. The diverter 18 is concentric with the primary rotary axis B-B and operatively diverts flow passing thereover into a primary annular flow path 48 defined between the diverter 18 and an inner peripheral wall 19 of the diverter housing 28, and as illustrated best in FIG. 5 and FIG. 6.

It will be appreciated that as the flow is squeezed from the bigger cross-sectional area of the axial flow duct portion 15 into the smaller cross-sectional area of the primary annular flow path 48, the velocity of the flow introducible to the primary turbine wheel 16 is increased significantly. Furthermore, the flow is steered by the diverter 18 to impinge the primary turbine wheel 16 substantially face-on and/or circumferentially, thereby to drive it with a substantially uniform pressure across its face and with a uniform velocity.

The diverter 18 includes a plurality of radially projecting diverter fins 50, spaced circumferentially about the diverter 18, configured for in use dividing the primary annular flow path 48 into a plurality of annular sector cross-sectioned primary flow channels 48A and operatively steering the axial flow over the diverter 18 and onto the primary turbine wheel 16.

The primary shaft 20 is coupled at one axial end to the primary turbine wheel 16 and at an opposite axial end to a primary compressor wheel 52 housed in a primary compressor housing 54, which primary compressor housing 54 is either integral with the turbine housing 12 or fastenable thereto.

The secondary flow duct 22 is also defined by the turbine housing 12. The secondary flow duct 22 is preferably annular and concentric with primary flow duct 14, lying more radially outwardly from the central axis A-A than the primary flow duct 14, between the inner peripheral wall 19 of the diverter housing 28 and an outer peripheral wall 25 thereof.

The secondary flow duct 22 includes an inlet 56 and at least one secondary flow duct outlet 58. The inlet 56 of the secondary flow duct 22 is positioned nearer the leading end 60 of the diverter 18, with the secondary flow duct outlet 58 positioned nearer the trailing end 62 of the diverter 18, while being configured to operatively direct flow to impinge the primary turbine wheel 16 more radially and circumferentially, with uniform pressure and velocity than axially.

Figure 5:
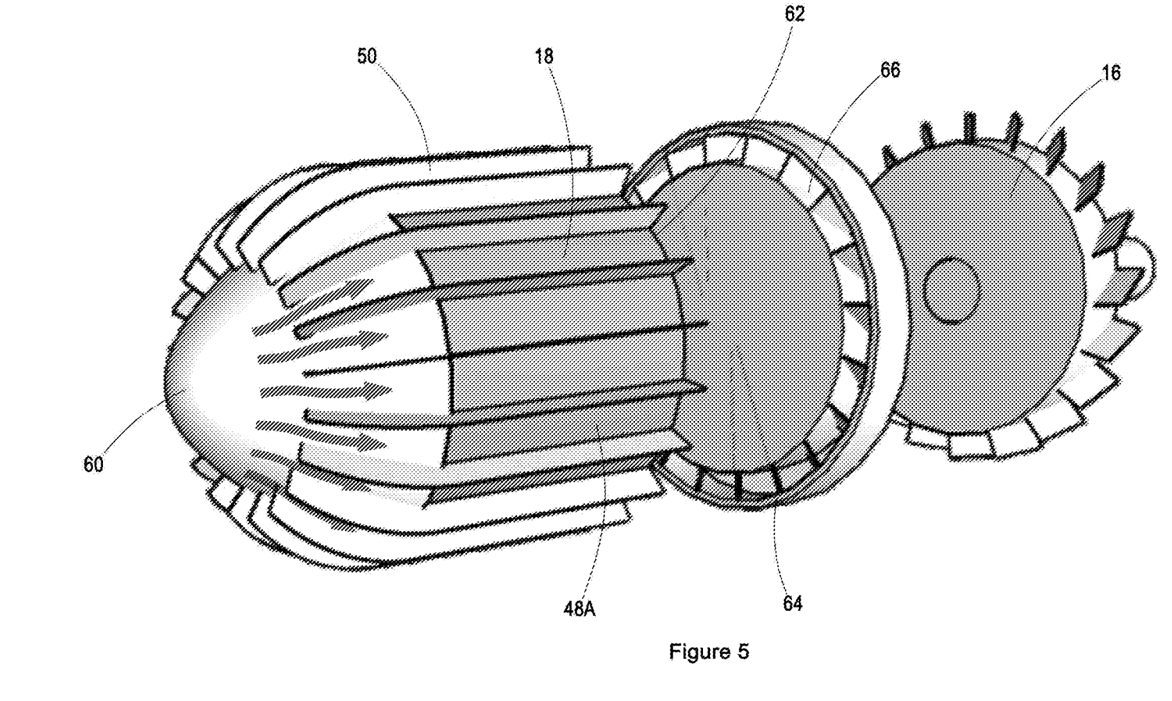
FIG. 5 is an exploded perspective view of the diverter, a primary deflector and the primary turbine wheel of the turbocharger of FIG. 1 to show the order in which the flow impinges such components.
Figure 6:
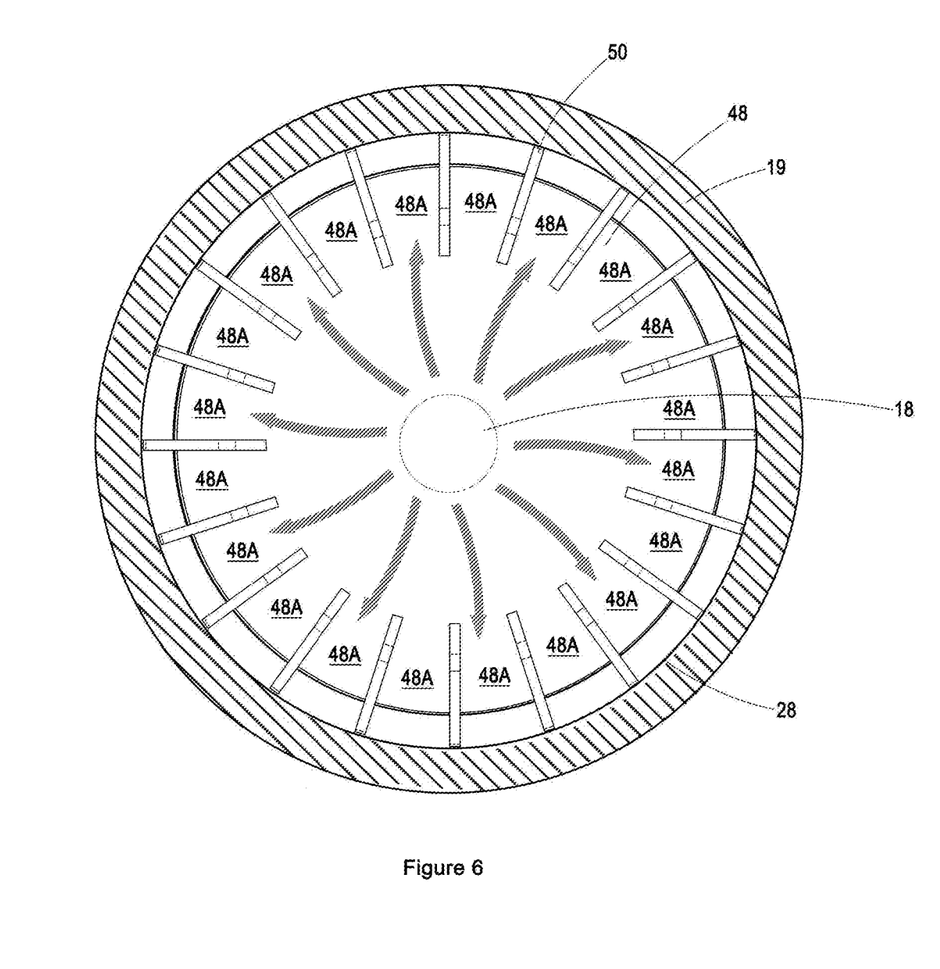
FIG. 6 is a cross-sectional front view of the diverter housing along line X-X.

It will be appreciated that the diverter 18 may be of a variety of shapes, for example, having tapering leading and trailings ends 60, 62 as depicted in FIGS. 1 and 2, or a cylinder with a tapering leading end 60 as depicted in FIG. 5. Such diverter 18 may include a plurality of radially inward nozzles, circumferentially aligned at or near a trailing end of the diverter 18. Such diverter 18 as described may partially surround the primary turbine wheel 16.

The secondary flow duct gate 23, also being annular in shape, is movable axially along the central axis A-A in a back-and-forth motion between the aforementioned open and closed positions. In the closed position (as illustrated in FIG. 1), the inlet 56 to secondary flow duct 22 is closed such that operative flow passes only through the primary flow duct 14. The secondary flow duct gate 23 is typically actuated in use to the closed position when the exhaust pressures are low.

In the open position (as illustrated in FIG. 2), the inlet 56 to the secondary flow duct 22 is open such that operative flow passes through both the primary and the secondary flow ducts 14, 22 to drive the primary turbine wheel 16. The secondary flow duct gate 23 is typically actuated in use to the open position when the exhaust pressures are high.

It will be appreciated then that the volume of the turbocharger 10 is variable. Under low exhaust pressure conditions, the secondary flow duct 22 is closed such that sufficient pressure exists to drive the primary turbine wheel 16.

Under high exhaust pressure conditions, the secondary flow duct 22 is opened such that the volume of the turbocharger 10 is increased thereby to act as a pressure relief mechanism. Instead of blowing off the pressure to atmosphere and loosing the energy stored therein (i.e. via a waste-gate), the excess flow is directed through the secondary flow duct 22 and ultimately over the primary turbine wheel 16 so as to extract some energy therefrom. It is believed that this configuration contributes largely to the efficiency of the turbocharger 10 of the present invention.

With reference to FIGS. 1, 2 and 5, the turbocharger 10 includes an annular primary deflector 64 located between the trailing end 64 of the diverter 18 and the primary turbine wheel 16. The primary deflector 64 comprises a plurality of angled primary deflector fins 66 for operatively steering the axial flow entering the primary deflector 64 from the primary annular flow path 48 into a flow having two or more of an axial, circumferential and radial flow component onto the primary turbine wheel 16.

It will be appreciated that the angle of the deflector fins 66 and the angle of the vanes 42, 44 on the primary turbine wheel 16 are designed and tuned to one another. In a preferred embodiment, the pitch of the deflector fins 66 and vanes 42, 44 are variable and controllable.

Figure 7:
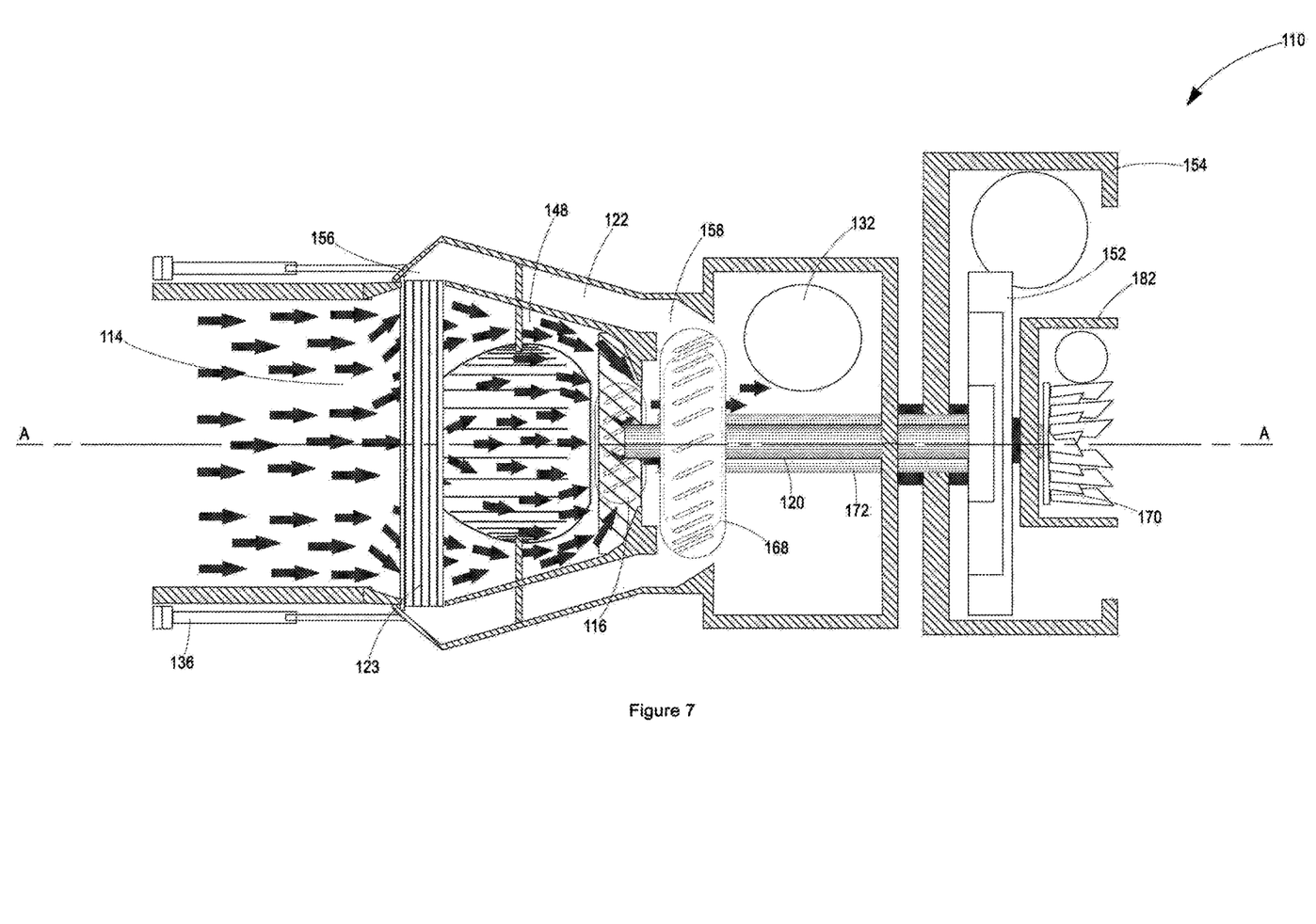
FIG. 7 is a cross-sectional side view of a second embodiment of a turbocharger in accordance with the present invention, with a secondary flow duct closed to flow.
Figure 8:
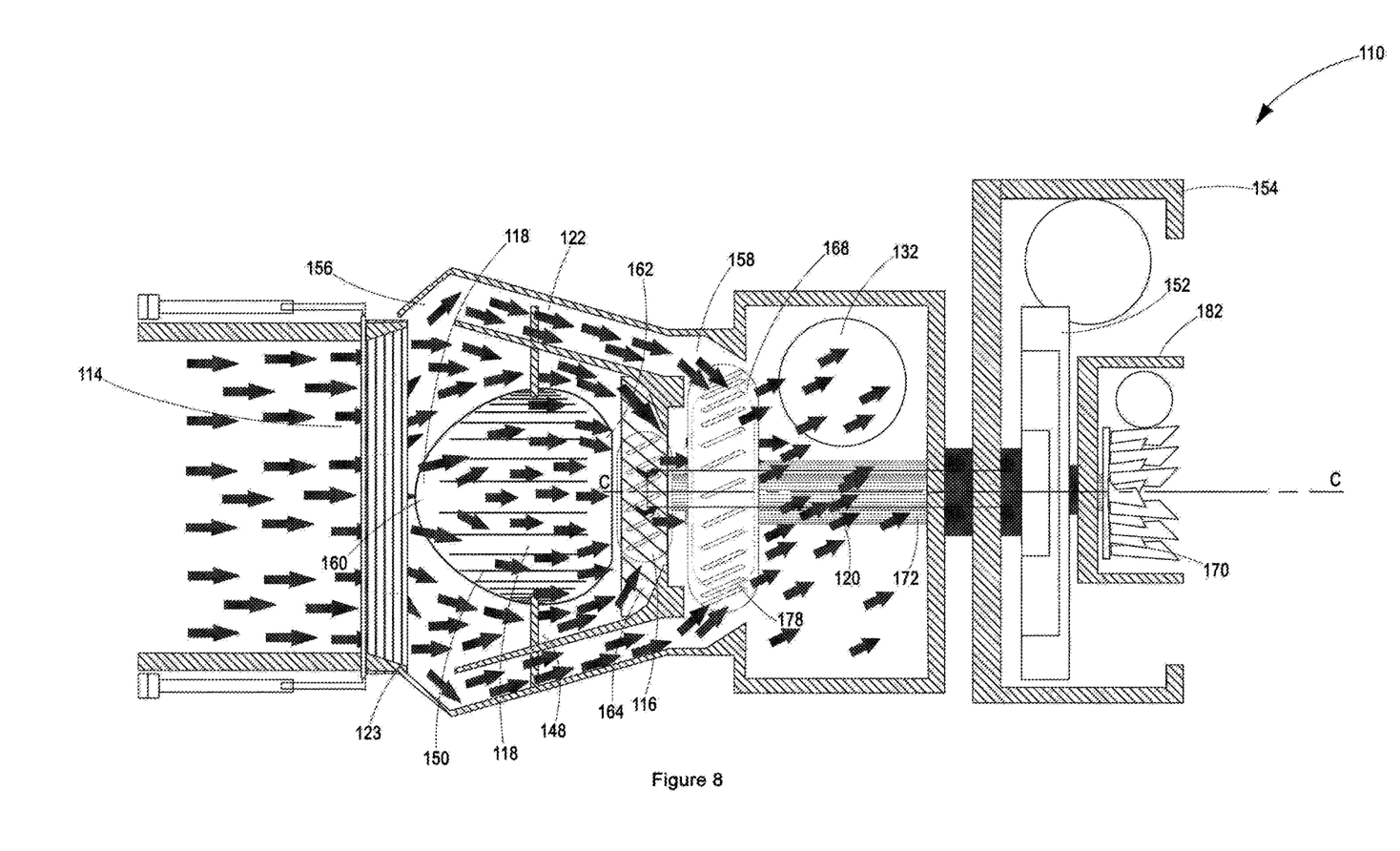
FIG. 8 is a cross-sectional side view of the turbocharger of FIG. 8, with a secondary flow duct open to flow.

With like references designating like components, FIGS. 7 and 8 illustrate a second embodiment of the turbocharger 110 in accordance with the present invention, which is very much similar to the turbocharger 10 previously described, other than the introduction of a secondary turbine wheel 168 and a secondary compressor wheel 170, being rotatable about a secondary rotary axis C-C, aligned with the central axis A-A.

The secondary turbine wheel 168 is coupled to one axial end to a secondary transmission, in the form of a secondary drive shaft 172, with the secondary compressor wheel 170 coupled to an opposite axial end thereof. The secondary drive shaft 172 is hollow such to allow the primary drive shaft 120 to pass concentrically therethrough thereby to couple the primary turbine wheel 116 to the primary compressor wheel 152.

The secondary turbine wheel 168 is located downstream of the primary turbine wheel 116, such that the outlet 158 of the secondary flow duct 122 directs flow passing therethrough onto the secondary turbine wheel 168, in a combined radial, circumferential and axial direction. In effect, the flow through the secondary flow duct 122 bypasses the primary turbine wheel 116.

It is appreciated that under one design configuration, the flow passing through the primary flow duct 114, once having passed and imparted energy onto the primary turbine wheel 116, could proceed to impinge on the secondary turbine wheel 168 imparting further energy thereto. However, it is envisaged that if energy is properly extracted from the flow exhausting from the primary turbine wheel 116, very little energy will remain extractable therefrom.

A preferred design configuration is having the flow passing over the primary turbine wheel 116 bypass the secondary turbine wheel 168, which is achievable by manufacturing the secondary turbine wheel 168 with one or more exhaust passages therethrough.

Figure 9:
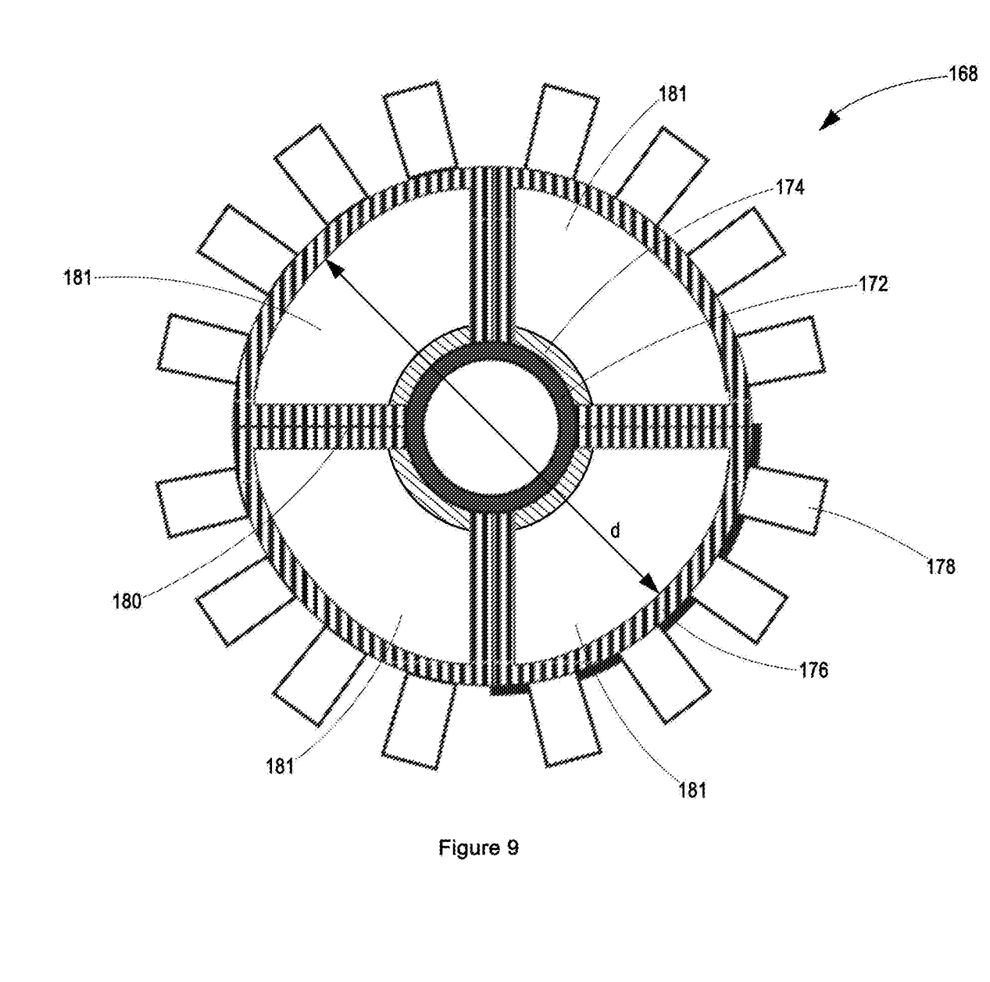
FIG. 9 is a perspective view of a secondary turbine wheel of the turbocharger of FIG. 8.

With reference now to FIG. 9, the secondary turbine wheel 168 comprises: a hub 174 for shaft-mounting the secondary turbine wheel 168 to the hollow secondary drive shaft 172; a base rim 176 from which the vanes 178 of the secondary turbine wheel 168 (whether impact type, lift type or other) radially project and along which they are circumferentially spaced; and a rim support in the form of a plurality of rim support spokes 180 for connecting the base rim 176 to the hub 174.

It will be appreciated that with the base rim 176 having a inner diameter "d" greater than an outer diameter "D" of the primary turbine wheel 116 (as shown in FIG. 3), the openings 181 defined between the hub 174, base rim 176 and the spokes 180 double up as exhaust passages through which such flow is capable of passing thereby to bypass the secondary turbine wheel 168.

The vanes 178 of the secondary turbine wheel 168 may also be angled to the secondary rotary axis C-C. Furthermore, the second embodiment of the turbocharger 110 may include a secondary deflector (not shown), located near the outlet 158 of the secondary flow duct 122, having deflector fins to steer the flow exiting the secondary flow duct 122 at the correct angle relative to the vanes 178 of the secondary turbine wheel 168. It will be appreciated that the pitch of the these vanes 178 and deflector fins are variable and controllable much the same as the vanes 42, 44 and deflector fins 50 of the turbocharger 10 of the first described embodiment.

The secondary compressor wheel 170 is housed in it own secondary compressor housing 182, or as part of the primary compressor housing 154 where the secondary compressor wheel 170 acts as a secondary stage thereof.

The actuator 136, for moving the secondary flow duct gate 123 between the open condition (as illustrated in FIG. 7) and the closed condition (as illustrated in FIG. 8), is mechanically or electronically controllable and triggered by predetermined set conditions, e.g. minimum and maximum pressures as measured by pressure sensors or minimum and maximum operating revolutions per second. In a preferred design, the secondary flow duct gate 123 is movable to one of the open or the closed positions by the actuator 136, and movable to the other of the open or the closed positions by a biasing means (not shown).

Figure 10:
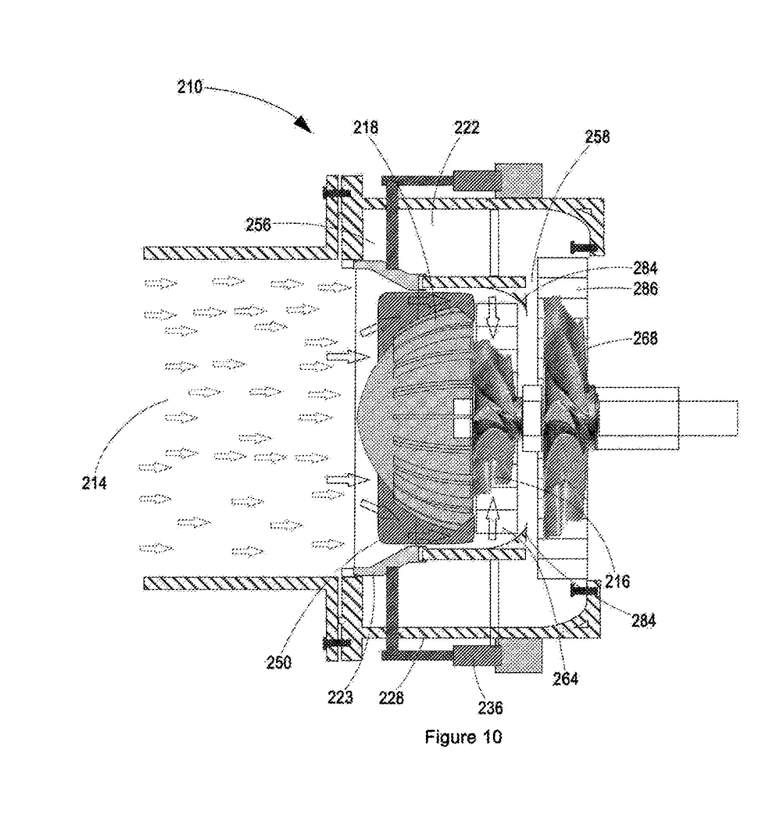
FIG. 10 is a cross-sectional side view of a third embodiment of a turbocharger in accordance with the present invention, with a secondary flow duct closed to flow.
Figure 11:
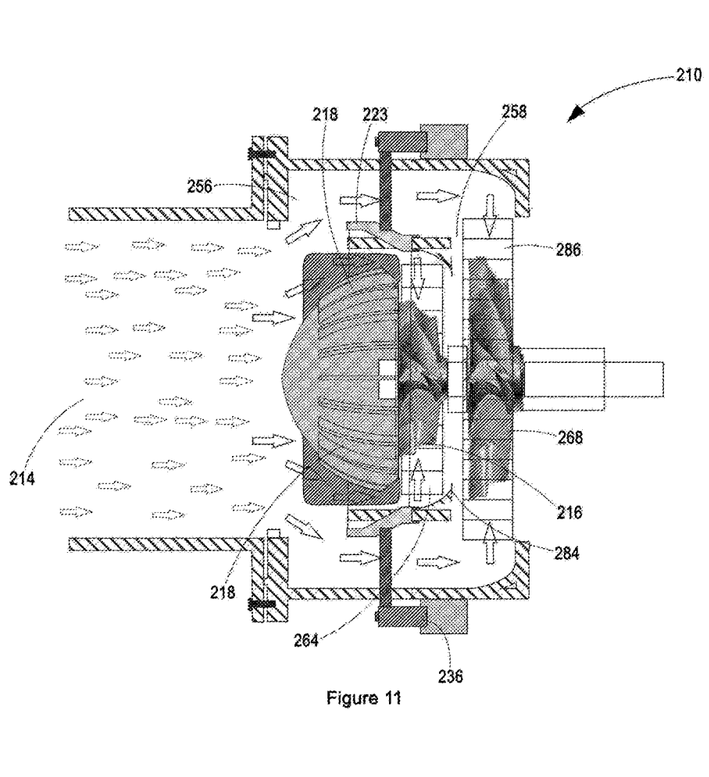
FIG. 11 is a cross-sectional side view of the turbocharger of FIG. 10, with a secondary flow duct open to flow.

With like references designating like components, FIGS. 10 and 11 illustrate a third embodiment of the turbocharger 210 in accordance with the present invention, which is very much similar to the turbochargers 10, 110 previously described, other than largely to the introduction of primary and secondary flow ducts 214, 222 that re-direct flow onto the primary and secondary turbine wheels 216, 268 more radially inwardly than the previous two embodiments of the invention.

The primary flow duct 214 comprises therealong guiding formations, in the form of radially inwardly projecting concave-shaped guides 284, positioned near the outlet the primary flow duct 214 that operatively acts to in use for re-direct at least some of the axial flow radially inwardly through the primary deflector 264 and onto the primary turbine wheel 214.

It will be appreciated the guides 284 act as a constriction or nozzle thereby to operatively increase flow velocity therethrough. Furthermore, the secondary flow duct gate 223 in the third embodiment of the invention 210 comprises a tapering diameter across its axial length, again for constricting flow to increase flow velocity toward the primary turbine wheel 216. The actuators 236 in this embodiment are preferably located on the diverter housing 228 section of the turbocharger 210.

The secondary flow duct 222 is shaped nearer an outlet 258 thereof to direct flow passing therethrough to flow radially inwardly, through a secondary deflector 286 and onto the secondary turbine wheel 268, as best illustrated in FIG. 11. It will be appreciated that the primary and secondary turbine wheels 216, 268 may be custom manufactured turbine wheels, or standard turbine wheels from existing radial-flow type turbochargers.

It will be appreciated that the turbocharger 10, 110, 210 of this invention, and particularly the third embodiment 210 thereof, combines the main advantages of axial-entry type turbochargers and radial-flow type turbocharges into a single turbocharger design—that is the uniformity of flow impact onto the turbine wheels offered by axial-entry type turbochargers, and the greater torque producing capability offered by radial-flow type turbochargers.

It will also be appreciated that the relevant features of the third embodiment 210 of the invention may also apply to a version thereof having a primary turbine wheel only (i.e. as described and illustrated in FIGS. 1 and 2).

Although the invention has been described with reference to a preferred embodiment, it will be appreciated that many modifications or variations of the invention are possible without departing from the spirit or scope of the invention.

For example:
- the single primary flow duct 14 may instead be replaced with a flow duct from each of the cylinders of a vehicle engine, effectively replacing the intake manifold with multi-passage direct pipes from the cylinders to the turbocharger 10, 110;
- the need for the primary deflector 64, 164 may be eliminated by replacing the straight diverter fins 50, 150 on the diverter 18, 118 with helical divert fins;
- the primary turbine wheel 16, 116 may be designed similar to the secondary turbine wheel 168 to reduce the weight thereof;
- one or more diametric constrictions/nozzles (fixed or variable) may be located along the various flow paths for increasing the flow velocity therethrough (i.e. just upstream of the turbine wheels);
- instead of being shaft-mounted, the primary and secondary turbine wheels may be rim-mounted with drive being transmissible to the respective primary and secondary drive shafts via a planetary gear transmission;
- inclusion of one or more fuel injectors to increase power output from the turbocharger; and
- inclusion of a waste-gate to further control the operating pressure of the turbocharger 10, 110.

The invention claimed is:

1. A turbocharger including:
   a turbine housing defining:
     a primary flow duct having at least one inlet, at least one outlet and a portion therebetween that is axial such that operative flow through the axial flow duct portion is substantially parallel with a central axis thereof; and
     a secondary flow duct having at least one inlet, and at least one secondary flow duct outlet being configured for operatively directing flow to: (i) impinge the primary turbine wheel; and/or (ii) bypass the primary turbine wheel;
   wherein the turbine housing includes a secondary flow duct gate movable between a closed position, wherein the inlet to the secondary flow duct is closed such that operative flow passes only through the primary flow duct under low pressure conditions, and an open position, wherein the inlet to the secondary flow duct is open such that operative flow passes through both the primary and the secondary flow ducts under high pressure conditions, such that the increased flow volume provided operatively by the opened secondary flow path acts at least partially as a pressure relief mechanism;

a primary turbine wheel mounted along the axial flow duct portion of the turbine housing, wherein the primary turbine wheel is rotatable relative to the turbine housing about a primary rotary axis being aligned with or parallel to the central axis of the axial flow duct portion;

a diverter located along the axial flow duct portion and upstream of the a primary turbine wheel, the diverter being concentric with the primary rotary axis and operatively diverts flow passing thereover into a primary annular flow path defined between the diverter and periphery of the primary flow duct;

a primary transmission for transmitting drive from the primary turbine wheel to a compressor;

a secondary turbine wheel mounted along the axial flow duct portion of the turbine housing, downstream of the primary turbine wheel, wherein:
  the secondary turbine wheel is rotatable relative to the turbine housing about a secondary rotary axis being aligned with or parallel to the primary rotary axis of the primary turbine wheel; and
  the secondary flow duct is configured such that the secondary flow duct outlet thereof is configured for operatively directing flow to bypass the primary turbine wheel and impinge the secondary turbine wheel;
  characterised in that the inlet to secondary flow duct lies nearer a leading end of the diverter, with the secondary flow duct outlet thereof lying nearer a trailing end of the diverter, the diverter being radially divergent, at least across a portion of its axial length, from the leading end towards the trailing end thereof; and
  characterised in that the secondary turbine wheel is coupled to the compressor, a secondary stage of the compressor or a secondary compressor via a secondary transmission thereby to transmit drive from the secondary turbine wheel to the compressor, the secondary stage thereof or the secondary compressor.

2. The turbocharger according to claim 1, wherein at least one of:
  (a) the secondary flow duct is annular, at least partially concentric with and located radially beyond the primary flow duct relative to the central axis thereof; and
  (b) the diverter includes a plurality of radially projecting diverter fins, spaced circumferentially about the diverter, for dividing the primary annular flow path into a plurality of annular sector cross-sectioned primary flow channels and operatively steering the axial flow over the diverter.

3. The turbocharger according to claim 2, wherein at least one of:
  (a) the secondary flow duct gate is annular, concentric with the primary flow duct and axially movable back-and-forth along the central axis relative to the turbine housing to open and close the annular inlet of the secondary flow duct; and
  (b) the primary turbine wheel includes: (i) a plurality of primary impact vanes projecting radially from and spaced circumferentially about the primary turbine wheel; (ii) a plurality of primary aerofoil-shaped lift vanes projecting radially from and spaced circumferentially about the primary turbine wheel; or (iii) a combination of both primary impact and aerofoil-shaped lift vanes; wherein the primary impact vanes and the primary aeorfoil-shaped lift vanes are parallel with the primary rotary axis, or angled with respect thereto.

4. The turbocharger according to claim 3, wherein at least one of:
  (a) the primary flow duct of the turbine housing is configured to operatively flow through the axial flow duct portion to impinge the primary turbine wheel and subsequently to impinge the secondary turbine wheel; and
  (b) the primary flowchart of the turbine housing and the secondary turbine wheel are configured to operatively channel flow exhausting from the primary turbine wheel to bypass the secondary turbine wheel such that the secondary turbine wheel is driven only by flow from the secondary flow duct.

5. The turbocharger according to claim 4, wherein the secondary turbine wheel includes (i) a plurality of secondary impact vanes projecting radially from and spaced circumferentially about the secondary turbine wheel; (ii) a plurality of secondary aerofoil-shaped lift vanes projecting radially from and spaced circumferentially about the secondary turbine wheel; or (iii) a combination of both secondary impact and aerofoil-shaped lift vanes.

6. The turbocharger according to claim 5 including an annular secondary deflector located between the secondary flow duct outlet of the secondary flow duct and the secondary turbine wheel, the secondary deflector having a plurality of angled secondary deflector fins for operatively steering the flow exhausting from the secondary flow duct into a flow having two or more of an axial, circumferential and radial flow component onto the secondary turbine wheel.

7. The turbocharger according to claim 6, wherein at least one of:
  (a) the secondary vanes are parallel with the secondary rotary axis or angled with respect thereto; and
  (b) the pitch of one or more of the primary vanes, the secondary vanes, the primary deflector fins and the secondary deflector fins are variable.

8. The turbocharger according to claim 7, wherein the primary turbine wheel is:
  shaft-mounted, comprising:
    a hub on which the primary wheel is rotatably supported on a primary drive shaft;
    a base rim, spaced radially outwardly from the hub and from which the primary vanes radially project; and
    a rim support for connecting the base rim to the hub, the rim support being a solid disc, a disc with a plurality of apertures defined therein or a plurality of spokes; or
  rim-mounted, comprising:
    a primary base ring having:
      an outer diameter from which the primary vanes radially project; and
      an inner diameter having gear formations running the circumference thereof; and
    a plurality of planetary gears positioned between the primary base ring gear formations and a sun gear mounted on a primary drive shaft such that drive is transmissible from the rim-mounted primary turbine wheel to the primary drive shaft.

9. The turbocharger according to claim 8, wherein the secondary turbine wheel is:
shaft-mounted, comprising:
- a hub on which the secondary wheel is rotatably supported on a secondary drive shaft;
- a base rim, spaced radially outwardly from the hub and from which the secondary vanes radially project; and
- a rim support for connecting the base rim to the hub, the rim support being a solid disc, a disc with a plurality of apertures defined therein or a plurality of spokes; or rim-mounted, comprising:
- a secondary base ring having:
  - an outer diameter from which the secondary vanes radially project; and
  - an inner diameter having gear formations running the circumference thereof; and
- a plurality of planetary gears positioned between the secondary base ring gear formations and a sun gear mounted on a secondary drive shaft such that drive is transmissible from the rim-mounted secondary turbine wheel to the secondary drive shaft.

10. The turbocharger according to claim 9, wherein the respective base ring, inner diameter gear formations, sun gear and planetary gears are the secondary transmissions, consequentially to drive the compressor, the first and second stages of the compressor or the two independent compressors.

11. The turbocharger according to claim 9, wherein the primary and secondary turbine wheels are shaft-mounted, the primary and the secondary drive shafts being: (i) a single common drive shaft connected to the compressor; or (ii) separate, with each of the primary and secondary drive shafts being connected to separate compressors.

12. The turbocharger according to claim 9, wherein the primary and secondary turbine wheels are shaft-mounted, the primary drive shaft being connected to a primary compressor impeller in a first stage of the compressor with the secondary drive shaft being connected to a secondary compressor impeller in a second stage of the compressor, and further wherein: (i) the primary and the secondary drive shafts are solid; or (ii) at least one of the primary and secondary drive shafts is hollow such that the other of the drive shafts passes concentrically therethrough.

13. The turbocharger according to claim 9, wherein the compressor comprises a primary compressor wheel housed in a compressor housing, the compressor housing being securable to the turbine housing or integral therewith; and a secondary compressor wheel, the primary compressor wheel being driven by the primary turbine and primary transmission, with the secondary compressor wheel being driven by the secondary turbine wheel and secondary transmission.

14. The turbocharger according to claim 13, wherein the secondary flow duct gate is axially movable towards: the open and closed positions by an actuator, the actuator being mechanically or electronically controllable to move in the event of predetermined set conditions; or one of the open or the closed positions by the actuator and towards the other of the open or the closed positions by a biasing means.

15. The turbocharger according to claim 14, wherein the primary and/or the secondary flow ducts define one or more diametric constrictions along their lengths for operatively increasing the flow velocity therethrough, the constrictions being located directly upstream of the primary or the secondary turbine wheels.

16. The turbocharger according to claim 15, wherein at least one of:
(a) the primary flow duct comprises guiding formations therealong for re-directing at least some of the axial flow into a radially inwardly directed flow onto the primary turbine wheel; and
(b) the secondary flow duct comprises guiding formations therealong for re-directing the flow into a radially inwardly directed flow onto the secondary turbine wheel, and further wherein the guiding formations project radially inwardly near the primary and secondary flow duct outlets, thereby acting as a constriction to flow to increase flow velocity therethrough.

17. The turbocharger according to claim 16, wherein at least one of:
(a) the secondary flow duct gate comprises a tapering diameter for constricting the flow and thereby increasing flow velocity therethrough, and the diverter fins of the diverter are helical, at least partially along an axial length of the diverter, for operatively steering the axial flow passing over the diverter into a flow for impinging the primary turbine wheel optimally;
(b) the turbocharger includes an annular primary deflector located between the trailing end of the diverter and the primary turbine wheel, the primary deflector having a plurality of angled primary deflector fins for operatively steering the axial flow entering the primary deflector from the primary annular flow path into a flow having two or more of an axial, circumferential and radial flow component onto the primary turbine wheel; and
(c) the perforated or spoke configured rim support disc, or the hollow body of the base rings, doubles as an exhaust path through which exhaust flow from the primary turbine wheel is operatively exhaustible to bypass the secondary turbine wheel such that the secondary turbine wheel is driven only by flow from the secondary flow duct.

* * * * *